United States Patent [19]

Baker

[11] Patent Number: 4,495,670
[45] Date of Patent: Jan. 29, 1985

[54] HAND-HELD SCRAPER

[76] Inventor: Alan J. Baker, 346 E. Mulberry St., Lancaster, Ohio 43130

[21] Appl. No.: 462,520

[22] Filed: Jan. 31, 1983

Related U.S. Application Data

[63] Continuation of Ser. No. 409,422, Aug. 23, 1982, abandoned.

[51] Int. Cl.³ .............................. A47L 1/06; B60S 1/04
[52] U.S. Cl. .................................... 15/236 R; 15/145; 30/169; 30/172
[58] Field of Search ................ 15/104 S, 236 R, 245, 15/145; 30/169, 172; D32/46, 48

[56] References Cited

U.S. PATENT DOCUMENTS

| | | | |
|---|---|---|---|
| D. 117,388 | 10/1939 | Woinarovicz | D32/46 |
| D. 129,285 | 9/1941 | Frank | D32/48 |
| D. 230,391 | 2/1974 | Dudte | D32/46 |
| 3,261,095 | 7/1966 | Nelson et al. | 30/169 |
| 4,121,316 | 10/1978 | Perry | 15/236 R |
| 4,141,111 | 2/1979 | Hopkins et al. | 15/236 R |
| 4,202,093 | 5/1980 | Wallerstein | 30/169 |

Primary Examiner—Edward L. Roberts
Attorney, Agent, or Firm—Frank H. Foster

[57] ABSTRACT

A plate-like structure features a pair of relatively opposing, equilateral, predominantly smooth faces, each of which is bordered completely by its own set of rigid working edges. A hand guard is also provided to removably receive any of the side surfaces extending between the opposing faces and the working edges adjacent to the selected side surface.

6 Claims, 6 Drawing Figures

HAND-HELD SCRAPER

BACKGROUND OF THE INVENTION

This is a continuation of U.S. Patent application Ser. No. 409,422 deposited on Aug. 23, 1982 by the same inventor and now abandoned incomplete.

The present invention relates generally to hand-held scrapers employed to remove solid and semi-solid substances from relatively smooth surfaces, and more particularly to scrapers having a plate-like structure and multiple working edges.

In the past, relatively compact, hand-held scrapers have been formed with a variety of useful features for ridding a surface of unwanted matter. As a result, however, the durability of these prior art devices has been limited. By maximizing the number of working edges, the present invention is intended to provide a scraper capable of surviving longer than the scrapers of the past.

The closest prior art known to the inventor are U.S. Pat. Nos. 2,115,216 issued Apr. 26, 1938 to Samuel; 2,277,528 issued Mar. 24, 1942 to Osborn; and 4,121,316 issued Oct. 24, 1978 to Perry.

U.S. Pat. No. 2,115,216 to Samuel discloses a plate-like structure having a pair of relatively opposing, equilateral faces, a plurality of side surfaces extending between the faces and a number of edges formed at the juncture of the faces and side surfaces. It will be noted however, that these features of the Samuel pot scrubber, while resembling elements of the present invention, are merely fortuitous. Samuel's pot scrubber need not be equilateral, as indicated in her drawings. Samuel's edges, like the rest of her pot scrubber, are flexible, not rigid as in the present invention, and would wear out quickly on solid substances, such as ice on a windshield. The faces of the Samuel device are grooved to form a plurality of parallel ridges, whereas the faces of the present scraper are substantially smooth. It is the ridges on the faces of the Samuel device, in contrast to the working edges of the present invention, that have the greater contact with the surfaces to be cleaned. The Samuel pot scrubber also lacks a hand guard into which any of the side surfaces and adjacent edges may be inserted, as found on the present scraper.

U.S. Pat. No. 2,277,528 issued to Osborn discloses an ice scraper having predominantly smooth, opposing faces and a hand guard adapted to removably receive one of the working edges of the device. In other respects, however, it differs from the present invention. Osborn's working edges do not completely surround the faces of his scraper, as found in the present invention, and one of Osborn's working edges is flexible, not rigid, as in the present scraper. Also, the faces of Osborn's scraper are not equilateral, so his hand guard is not adapted to fit over any of the side surfaces as in the present invention.

Finally, U.S. Pat. No. 4,121,316 to Perry discloses the formation of a plurality of working edges where the side surfaces of the scraper meet the opposing faces thereof. The working edges of the Perry scraper, however, do not completely border the opposing faces, but are instead confined to generally opposing side surfaces. Unlike the present invention, two of the side surfaces of the Perry device cannot be used to form working edges with the faces because the device is flexible in only one plane and would tend to break if the wrong edge were applied to an encrusted object, such as ice on a windshield. The Perry scraper also lacks the smooth, equilateral faces and hand guard of the present invention.

SUMMARY AND OBJECTS OF THE INVENTION

The present hand-held scraper comprises a plate-like structure having a pair of relatively opposing, predominantly smooth, equilateral faces and a plurality of side surfaces extending between the equilateral faces. A plurality of rigid working edges completely bordering each of the faces are formed at the junctures of the equilateral faces and side surfaces. In addition, a hand guard having an elongated cavity is provided to selectively and removably receive each of the side surfaces of the plate-like structure and the working edges immediately adjacent to the selected side surface.

A primary object of the present invention is to provide a durable scraper for removing solid and semi-solid objects from smooth surfaces.

Another object of the present invention is to provide a scraper having at least twice as many working edges as side surfaces.

A further object of the present invention is to provide a scraper sized to permit the palm portion of a hand to abut against a protected end and the fingers and thumb to press, respectively, against relatively opposing faces while the scraper is being used.

Yet another object of the present invention is to provide a scraper that is formed with corners that may be employed to chip badly encrusted material away from a smooth surface.

Further objects and advantages of the present invention will become more apparent in view of the following drawings and description of the preferred embodiment.

DETAILED DESCRIPTION OF THE PREFERRED EMBODIMENT

Figure 1:
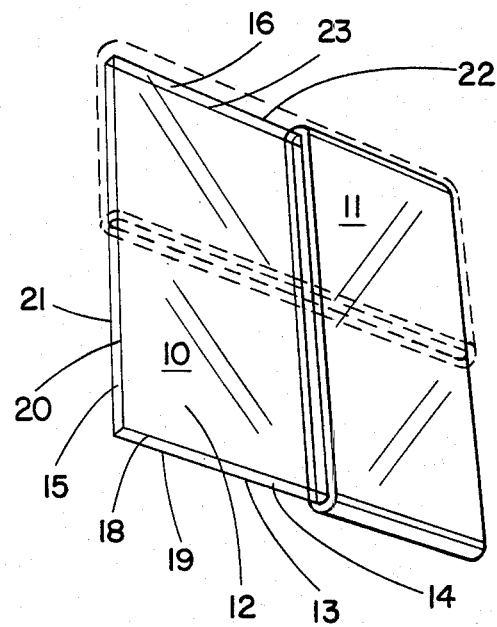
FIG. 1 is a perspective view of a preferred form of the present hand-held scraper, with an alternative position of the hand guard indicated by phantom lines.
Figure 2:
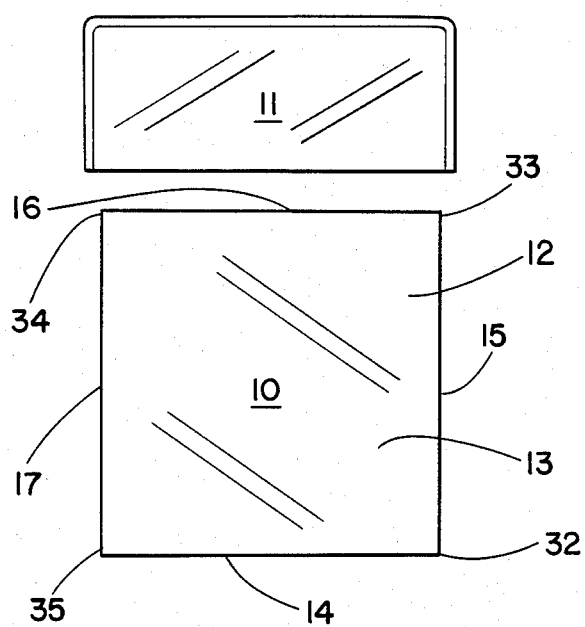
FIG. 2 is a top plan view of the present hand-held scraper with the hand guard and plate-like structure separated and turned in generally the opposite direction from FIG. 1.
Figure 3:
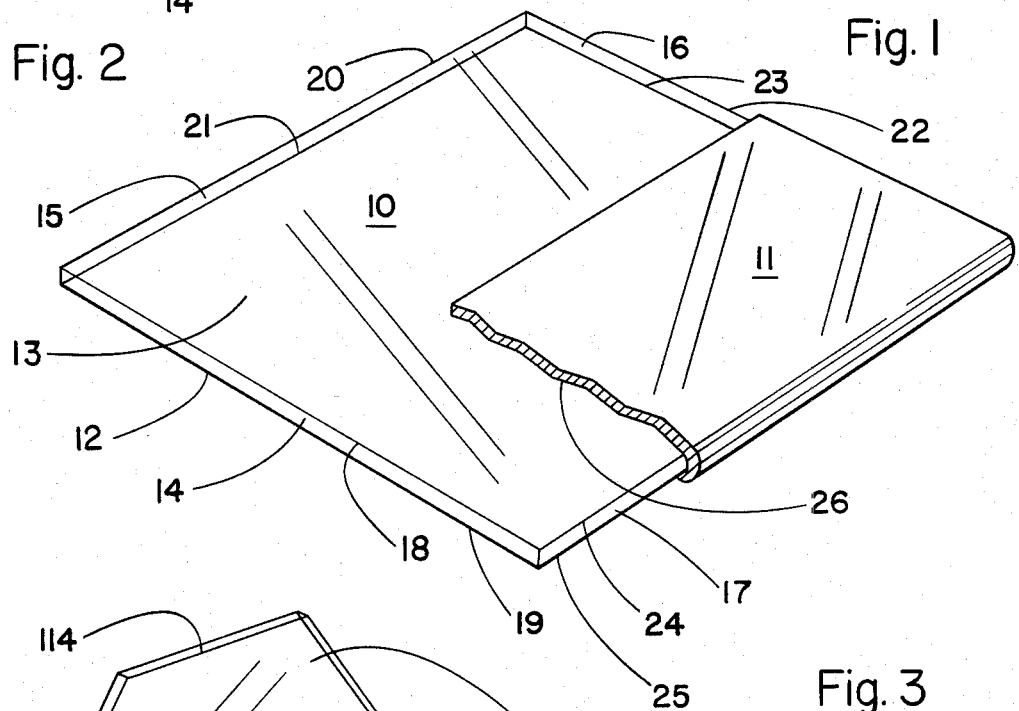
FIG. 3 is an enlarged perspective view of the present scraper with a portion of the hand guard broken away.

As illustrated, the present invention basically comprises a plate-like structure 10 and a hand guard 11. The plate-like structure 10 has a pair of relatively opposing, equilateral, predominantly smooth-surfaced faces 12 (FIGS. 1 and 2) and 13 (FIG. 2) and a plurality of side surfaces 14, 15, 16 and 17 (FIGS. 1 and 3) extending between the equilateral faces 12 and 13. The faces are defined as equilateral because, as best indicated in FIG. 2, all of the sides 14–17 of the plate-like structure 10 are substantially equal in length. A plurality of substantially rigid working edges 18–25 (FIGS. 1 and 3) completely bordering each of the faces are formed where the side surfaces and faces meet. The hand guard 11 in turn, is provided with an elongated cavity 26 (FIG. 3) for selectively and removably receiving each of the side surfaces 14–17 of the plate-like structure 10 and the working edges immediately adjacent to the selected side surface. The side surface 17 and the working edges 24 and 25 (FIG. 3), for instance, are received in the hand guard 11 illustrated in the drawings. Since the side surfaces 14–17 of the plate-like structure 10 are equal in length, however, the hand guard 11 may be repositioned to cover any of the side surfaces and working edges, such as, as indicated in phantom lines in FIG. 1, side surface 16 and working edges 22 and 23.

Figure 4:
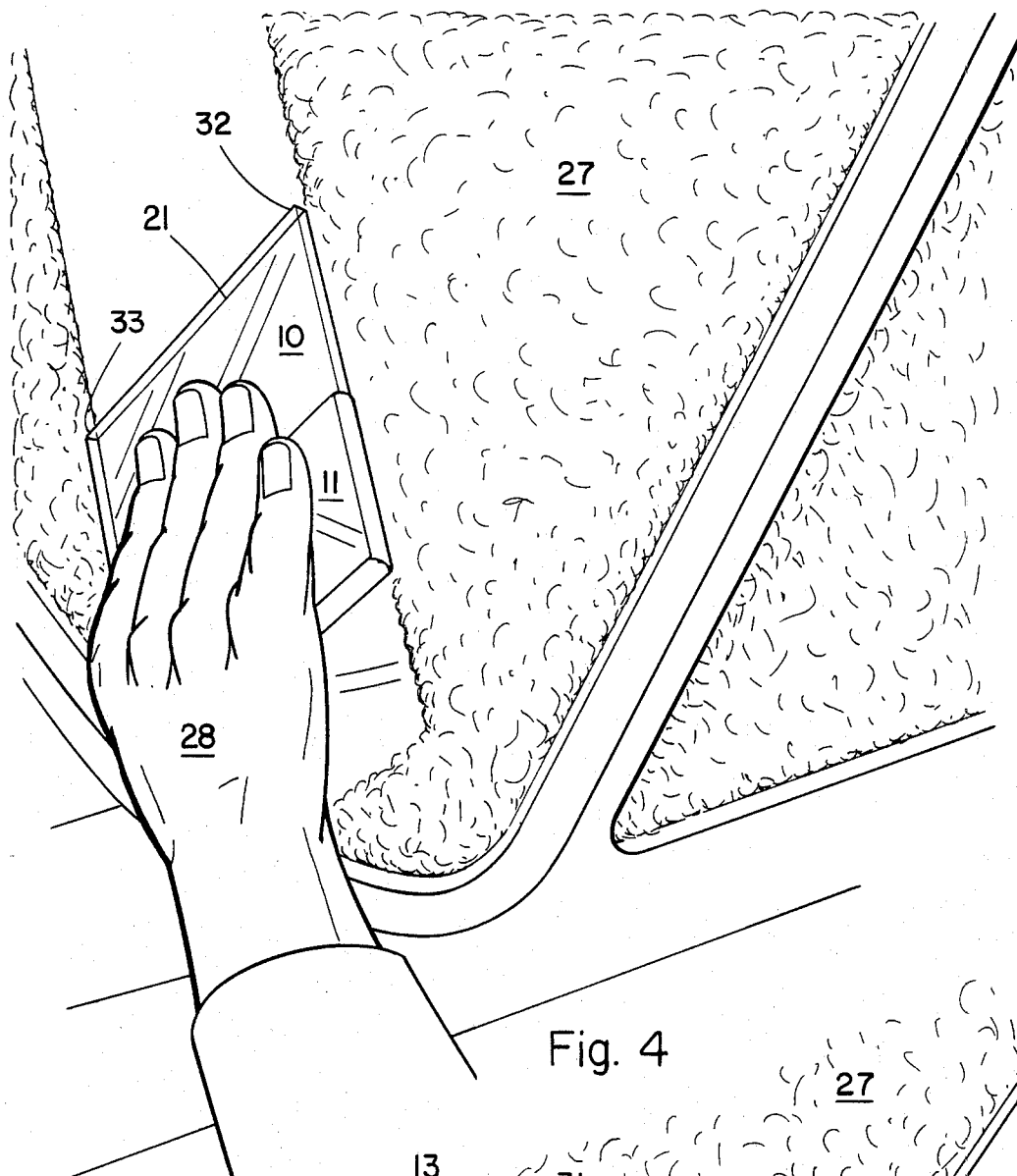
FIG. 4 is a perspective view of the manner in which one working edge of the present invention may be applied to a surface.
Figure 5:
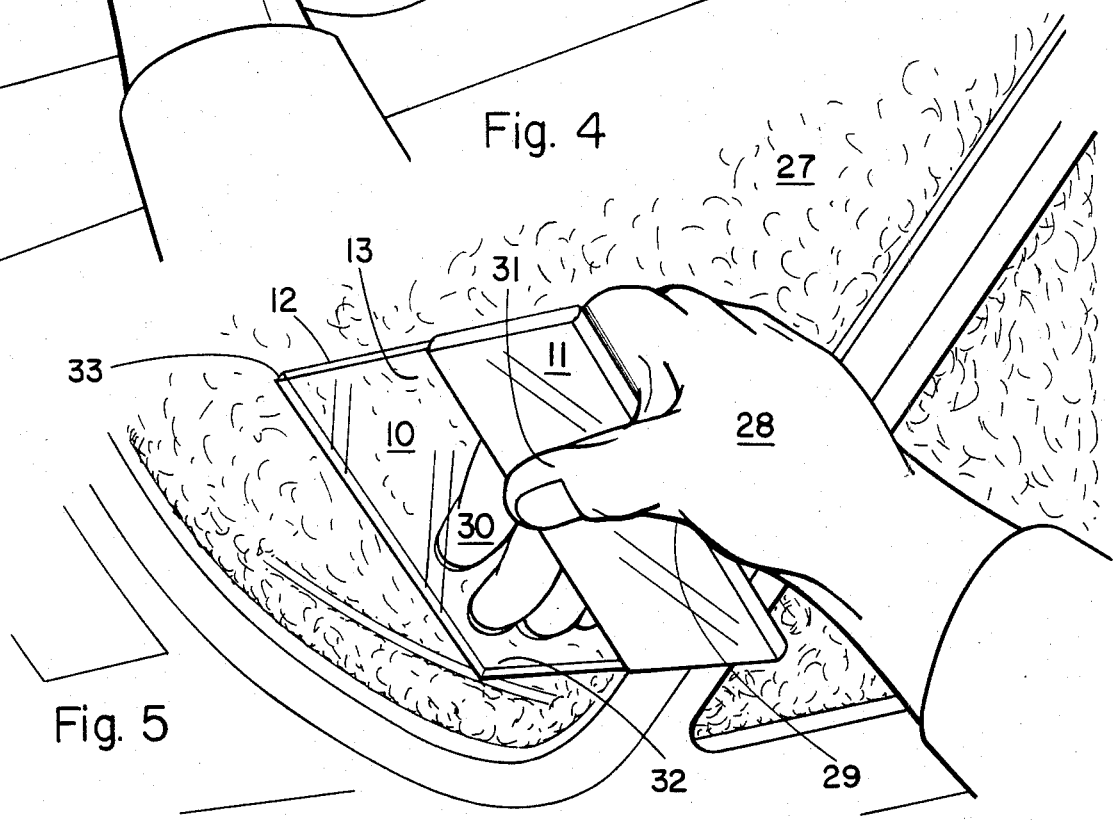
FIG. 5 is a perspective view of the manner in which one working corner of the present invention may be applied to a surface.

The present hand-held scraper may be used advantageously to remove solid or semi-solid substances from smooth surfaces. For instance, as illustrated in FIGS. 4 and 5, the present scraper is ideally suited for the removal of snow and ice from a windshield 27. Preferably, both the plate-like structure 10 and the hand guard 11 are formed from synthetic resin material when the present invention is employed as an ice scraper, so that the windshield will not be scratched. Abrasion resistant, polycarbonate plastics such as Lexan and Tuffak may be used to form the plate-like structure 10, and polyvinyl chloride, plastisol or the like may be used to form the hand guard 11, although other synthetic resins are also suitable. The plate-like structure may be stamped or otherwise cut out of large sheets of extruded plastic, or it, as well as the hand guard, may be injection molded. On the other hand, it is also possible to form the plate-like structure from sheet metal and the hand guard from wood or rubber when the present invention is embodied in a paint scraper or the like.

Preferably, the working edges 18–25 of the plate-like structure 10 are substantially straight and extend longitudinally a distance equal to the length of each of the side surfaces 14–17. It would also be possible, however, to have one or more serrated edges (not shown). In any event, the scraper is constructed so that every edge is functional and hence, a working edge. Likewise, it is preferred that each of the side surfaces 14–17 meet each of the equilateral faces 12 and 13 at an angle no greater than ninety degrees (90°). Thus, the side surfaces 14–17 may be perpendicular to the faces, as illustrated, or concave so that acute edges are formed between the side surfaces and faces. Concave side surfaces would be useful when the present invention serves as a paint scraper, whereas perpendicular side surfaces serve well on the illustrated ice scraper embodiment. In either case, the working edges 18–25 may be renewed to some extent by a sharpening or grinding tool (not shown) to extend the life of the present scraper.

As illustrated in FIGS. 4 and 5, the hand-held scraper is, as its name implies, intended to fit comfortably, in the average human hand 28. Preferably, it is sized to permit the palm 29 (FIG. 5) to abut against the closed end of the hand guard 11, with the finger tips 30 and 31 pressing, respectively, against the relatively opposing, equilateral faces 12 and 13 of the plate-like structure 10. Faces having a length of four inches per side, for instance, are well suited to this purpose. Downward pressure may thus be exerted by the fingertips to keep the working edge 21 against the windshield 27 (FIG. 4) while forward pressure is applied by the palm. Since the faces of the plate-like structure are substantially smooth, the finger tips or gloves (not shown) will not be abraded if the scraper slides in the hand as these forces are applied.

Each pair of adjacent side surfaces, 14 and 15, 15 and 16, 16 and 17, 17 and 14 preferably forms a rigid working corner 32, 33, 34 and 35, respectively, as best indicated in FIG. 2. The working corners 32–35 extend between the faces 12 and 13 and, like the side surfaces that define them, are relatively narrow. A plate-like structure having a one-eighth inch thickness has been found to be well suited for this purpose. As indicated in FIG. 5, the relative narrowness of the working corners 32–35 permits the force exerted by the hand to be applied to a smaller area, thereby providing a means of breaking through larger sheets of ice before applying one of the working edges 18–25.

Figure 6:
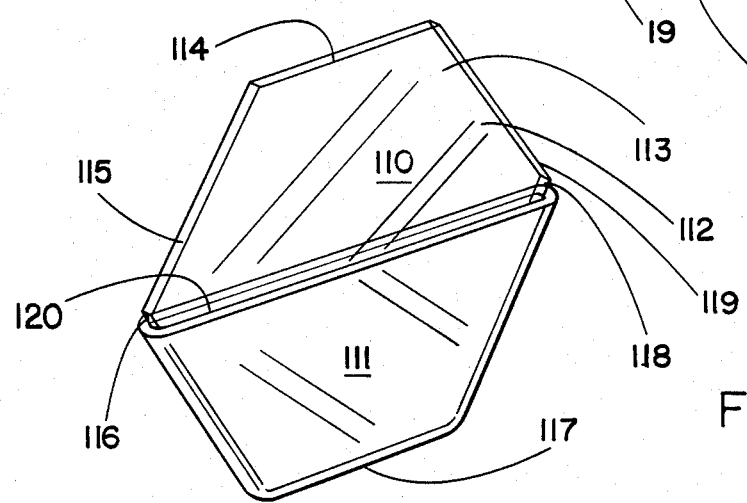
FIG. 6 is a perspective view of an alternative embodiment of the present hand-held scraper.

Preferably, the plate-like structure has four side surfaces, as indicated in FIGS. 1–5. It would also be possible, however, to have a greater number of side surfaces, such as the hexagonally shaped scraper in FIG. 6. Like the four sided scraper in FIGS. 1–5, the six sided scraper in FIG. 6 basically comprises a plate-like structure 110 and a hand guard 111. The plate-like structure 110 has a pair of relatively opposing, predominantly smooth, equilateral faces 112 and 113 and six side surfaces 114–119. Six substantially rigid working edges completely border each of the equilateral faces. Likewise, the hand guard 111 is provided with an elongated cavity 120 for selectively and removably receiving each of the side surfaces 114–119 and the working edges immediately adjacent to the selected side surfaces.

Thus it may be seen that the present invention provides a hand-held scraper having a large working-edge-to-overall-size ratio, a compact, efficient shape, and an ability to adapt to many uses.

While only two embodiments of the present invention have been illustrated and described in detail, it is to be understood that various modifications in the construction of the hand-held scraper may be made without departing from the spirit of this invention or the scope of the following claims.

I claim:
1. A two piece hand-held scraper comprising:
   (a) a plate-like structure having a pair of relatively opposing, predominantly smooth, equilateral faces and forming therewith a plurality of rigid working edges of equal length completely bordering each of said equilateral faces; and
   (b) a hand guard provided with an elongated cavity for selectively and removably receiving each of the side surfaces of said plate-like structure and the working edges immediately adjacent to the selected side surface, said cavity sized to fit snugly about said surfaces and said hand guard composed of a flexible material to removably adhere to said plate-like structure, the removal and placement of said hand guard about said side surfaces changing said working edges to be used for scraping.

2. A hand-held scraper according to claim 1, wherein each of said rigid working edges is substantially straight and said equilateral faces are square in shape.

3. A hand-held scraper according to claim 1, wherein each of said side surfaces meet each of said equilateral faces at an angle no greater than ninety degrees.

4. A hand-held scraper according to claim 1, wherein said plate-like structure and said hand guard are formed from two different synthetic resin materials, said plate-like structure formed from a synthetic resin material which cures to a hard rigid state, and said hand guard formed from a synthetic resin material, which cures to a soft pliable state.

5. A hand-held scraper according to claim 1, wherein said scraper is sized to permit the palm portion of a hand to abut against the hand guard with the finger tips and thumb pressing, respectively, against the relatively opposing, equilateral faces of the plate-like structure.

6. A hand-held scraper according to claim 1, wherein said scraper is used as a windshield scraper and said plate-like structure has square equilateral faces, said edges of said faces being substantially straight, said plurality of side surfaces being four in number and meet each of said equilateral faces at substantially a right angle, said plate-like structure formed from a synthetic resin material which cures to a hard rigid state, and said hand guard formed from a synthetic resin material, which cures to soft pliable state.

* * * * *